(12) United States Patent
Thompson

(10) Patent No.: US 8,235,172 B2
(45) Date of Patent: Aug. 7, 2012

(54) COMBINATION ASCENDER/DESCENDER

(76) Inventor: Morgan Thompson, Ithaca, NY (US)

( * ) Notice: Subject to any disclaimer, the term of this patent is extended or adjusted under 35 U.S.C. 154(b) by 2042 days.

(21) Appl. No.: 11/052,071

(22) Filed: Feb. 8, 2005

(65) Prior Publication Data

US 2005/0262669 A1 Dec. 1, 2005

Related U.S. Application Data

(60) Provisional application No. 60/575,368, filed on Jun. 1, 2004.

(51) Int. Cl.
*A62B 1/14* (2006.01)
(52) U.S. Cl. .............................. 182/5; 182/192; 188/65.2
(58) Field of Classification Search ...... 182/5, 191–193; 188/65.2–65.5; 24/134 P, 132 R
See application file for complete search history.

(56) References Cited

U.S. PATENT DOCUMENTS

| | | | | |
|---|---|---|---|---|
| 433,481 A | * | 8/1890 | Mansfield | 188/65.5 |
| 2,157,639 A | * | 5/1939 | Staggers | 24/132 R |
| 2,773,566 A | | 12/1956 | Staggers | |
| 3,702,689 A | * | 11/1972 | Zeller | 254/107 |
| 4,226,305 A | * | 10/1980 | Frestad | 188/65.2 |
| 4,413,382 A | * | 11/1983 | Siegmann | 24/132 R |
| 4,450,603 A | * | 5/1984 | Hirsch | 24/132 R |
| 4,632,226 A | * | 12/1986 | Koch | 188/65.1 |
| 4,667,772 A | | 5/1987 | Kammerer | |
| 5,217,092 A | | 6/1993 | Potter | |
| 5,279,020 A | | 1/1994 | Coe | |
| 5,544,723 A | | 8/1996 | Gettemy | |
| 5,597,052 A | | 1/1997 | Rogleja | |
| 5,664,640 A | | 9/1997 | Smith | |
| 5,975,243 A | | 11/1999 | Lorbek | |
| 6,085,866 A | | 7/2000 | Kowakewski | |
| 6,715,809 B2 | | 4/2004 | Thompson | |
| 2003/0196853 A1 | | 10/2003 | LeBeau et al. | |

FOREIGN PATENT DOCUMENTS

DE 3624935 A1 * 1/1988

OTHER PUBLICATIONS

Smith, "Comparative Review of Ascenders", www.gearreview.com.
Sherrill Arborist Supply Catalog; 2004 Master Catalog, pp. 34-37.

* cited by examiner

*Primary Examiner* — Alvin Chin Shue

(57) ABSTRACT

An ascending/descending assembly is simple, strong, safe, easy to use, and can be used with either single rope or double rope technique. The assembly includes at least first, second, and third (and preferably fourth and fifth) clamping elements. Each element has a first side edge, a first end edge, a main opening large enough for a rope extending in a first dimension through it, and a slot extending between the first side edge and the opening, the slot allowing a rope to pass through the slot into the opening. A connecting element (such as a chain) is operatively pivotally connected adjacent the first end edges of each of the clamping elements.

18 Claims, 9 Drawing Sheets

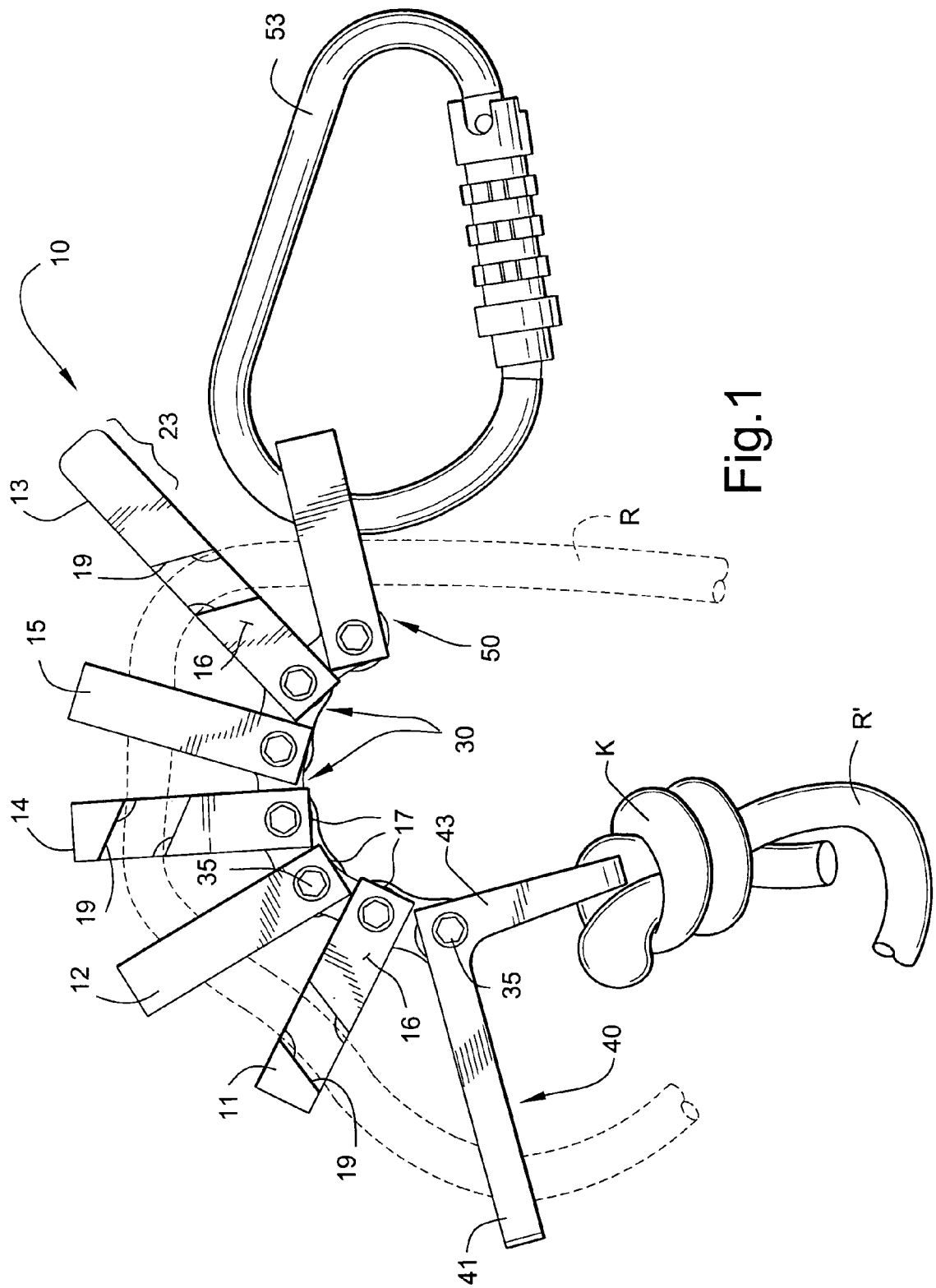

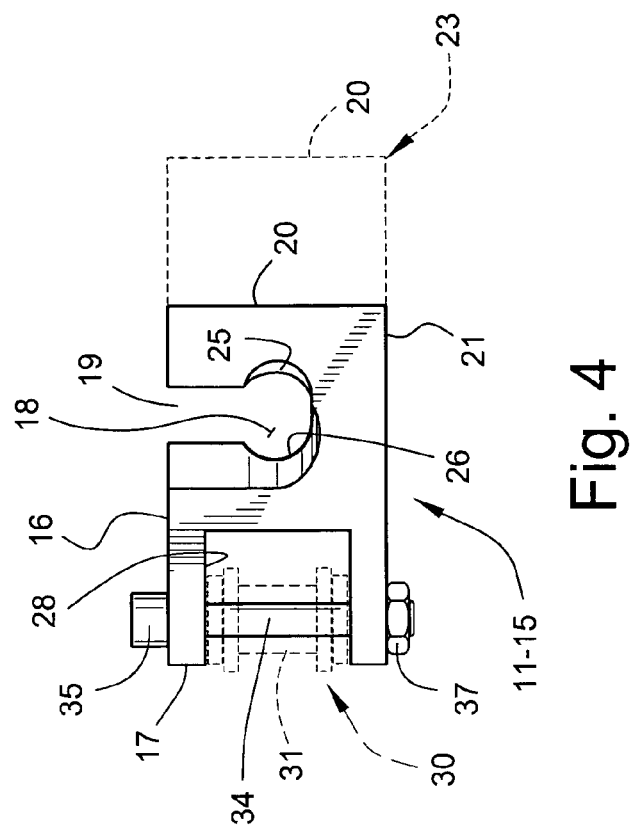
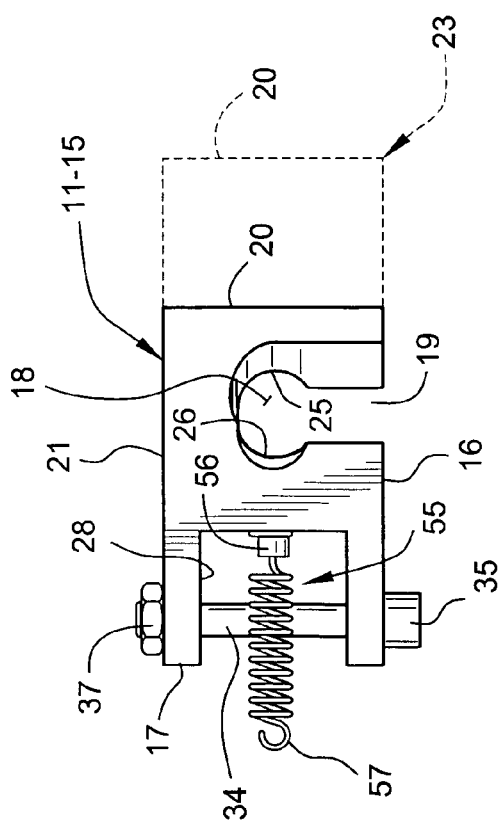
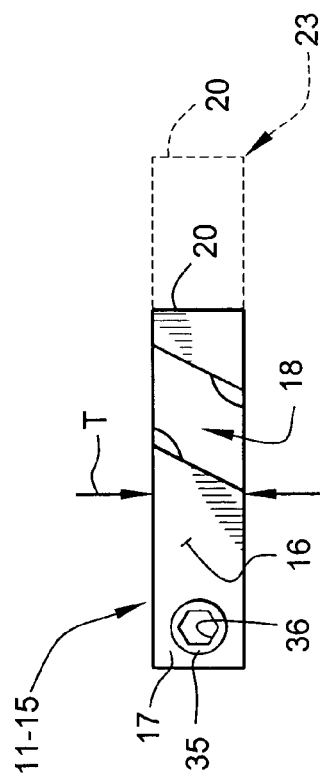

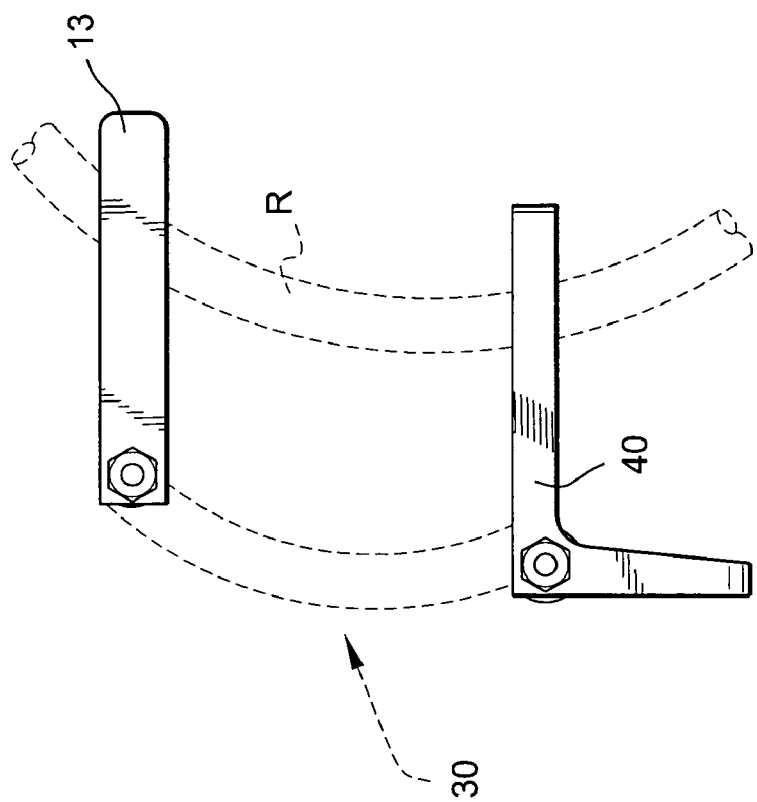
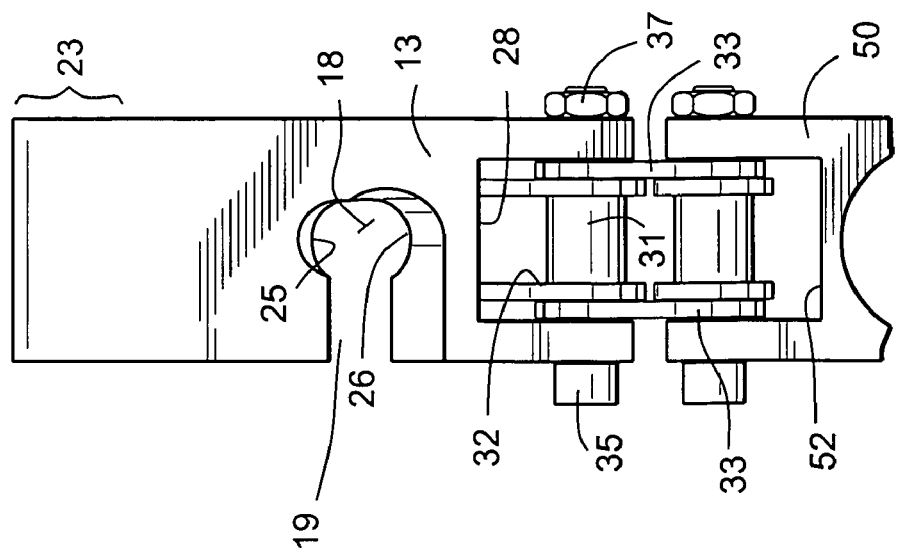

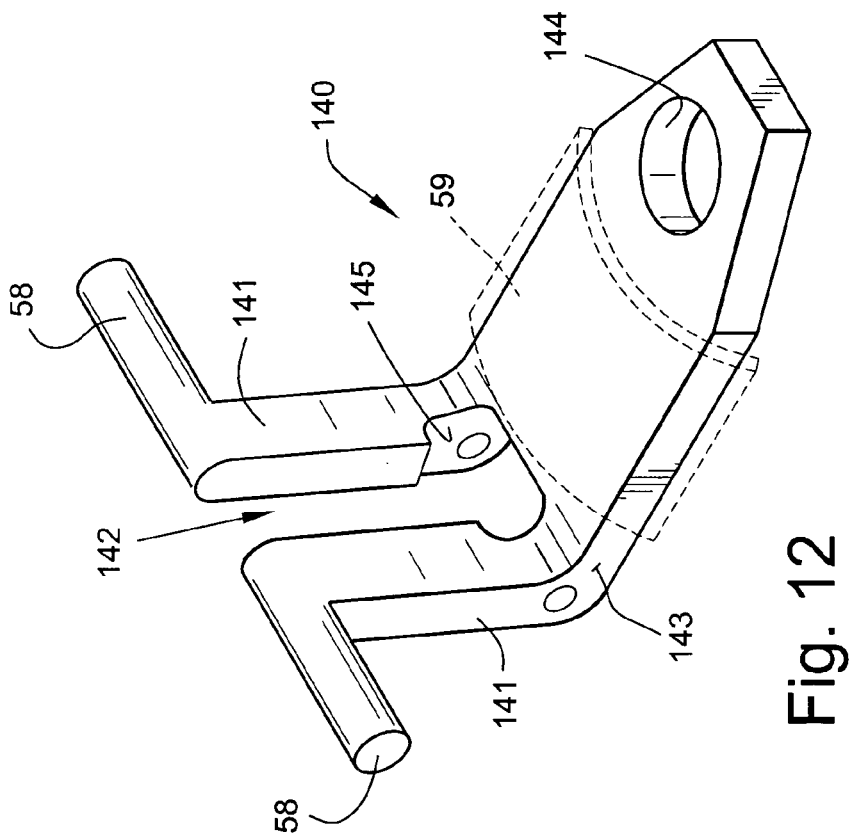
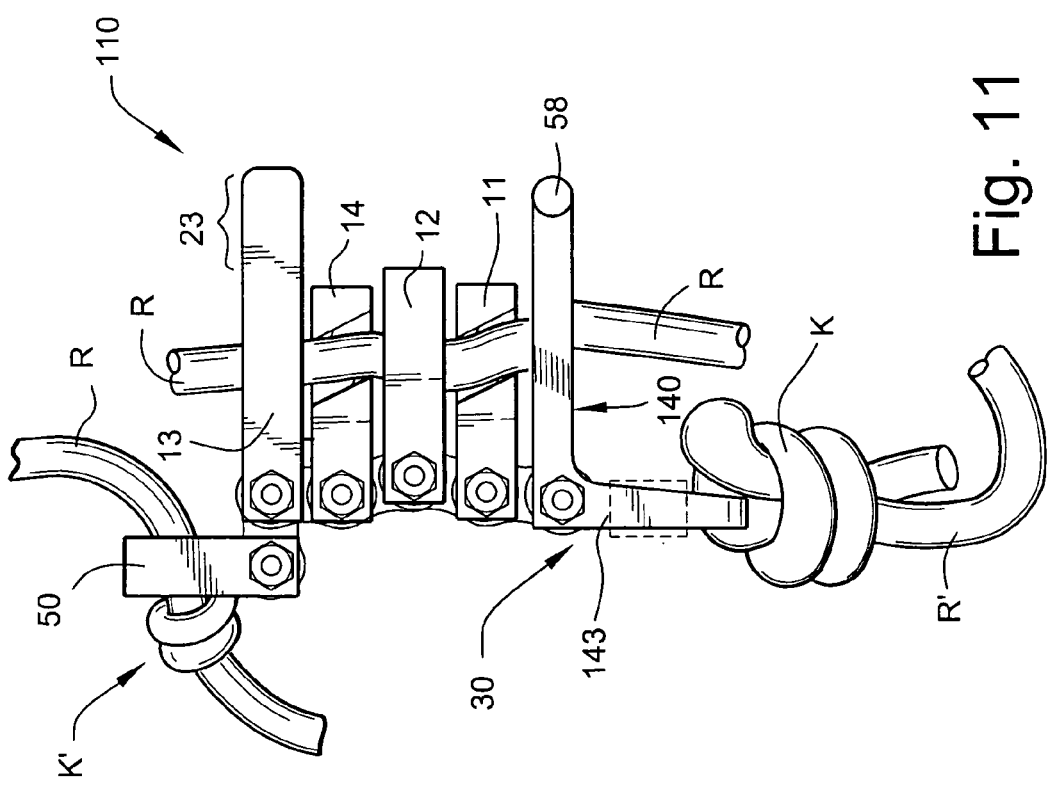
Fig. 12
Fig. 11

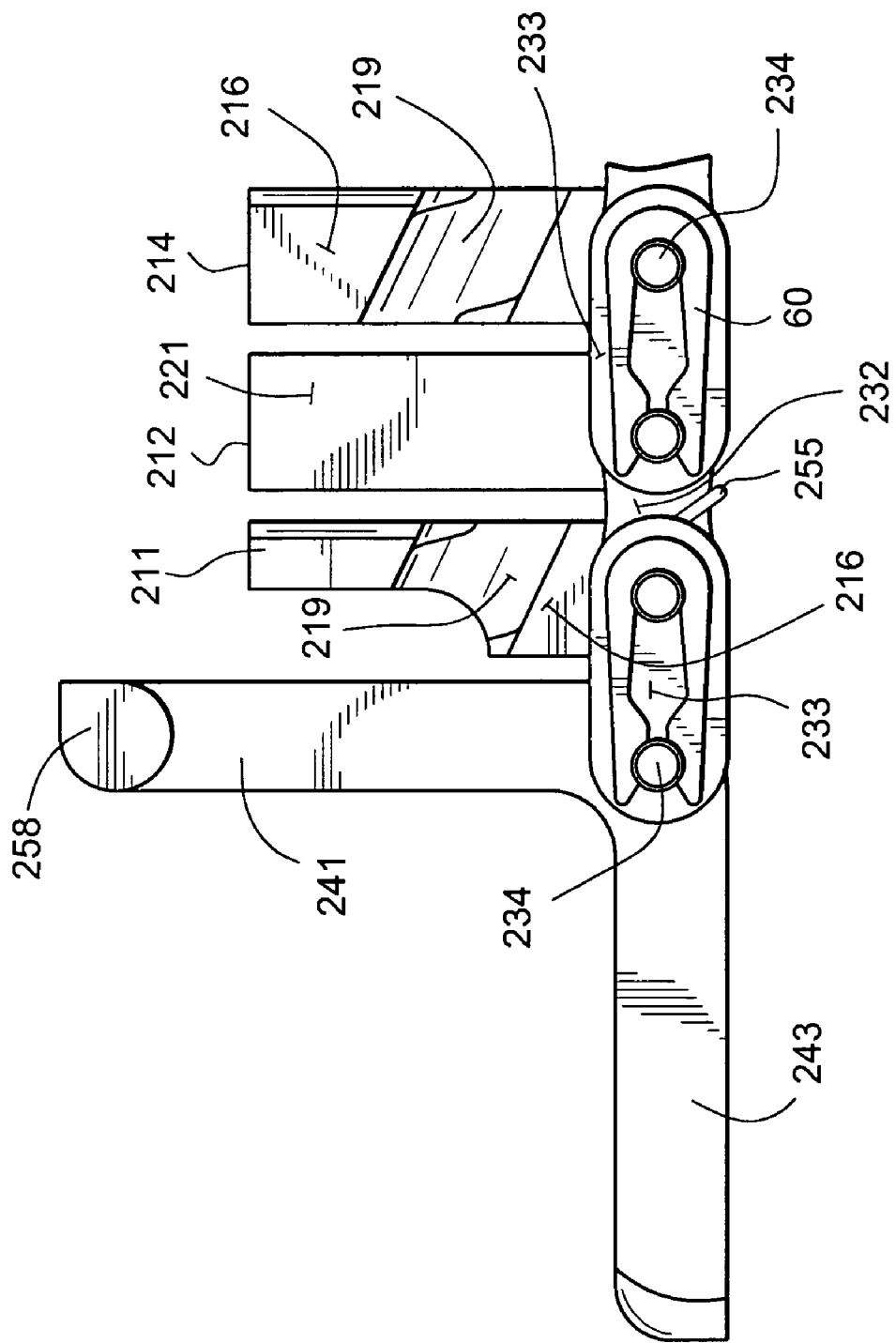

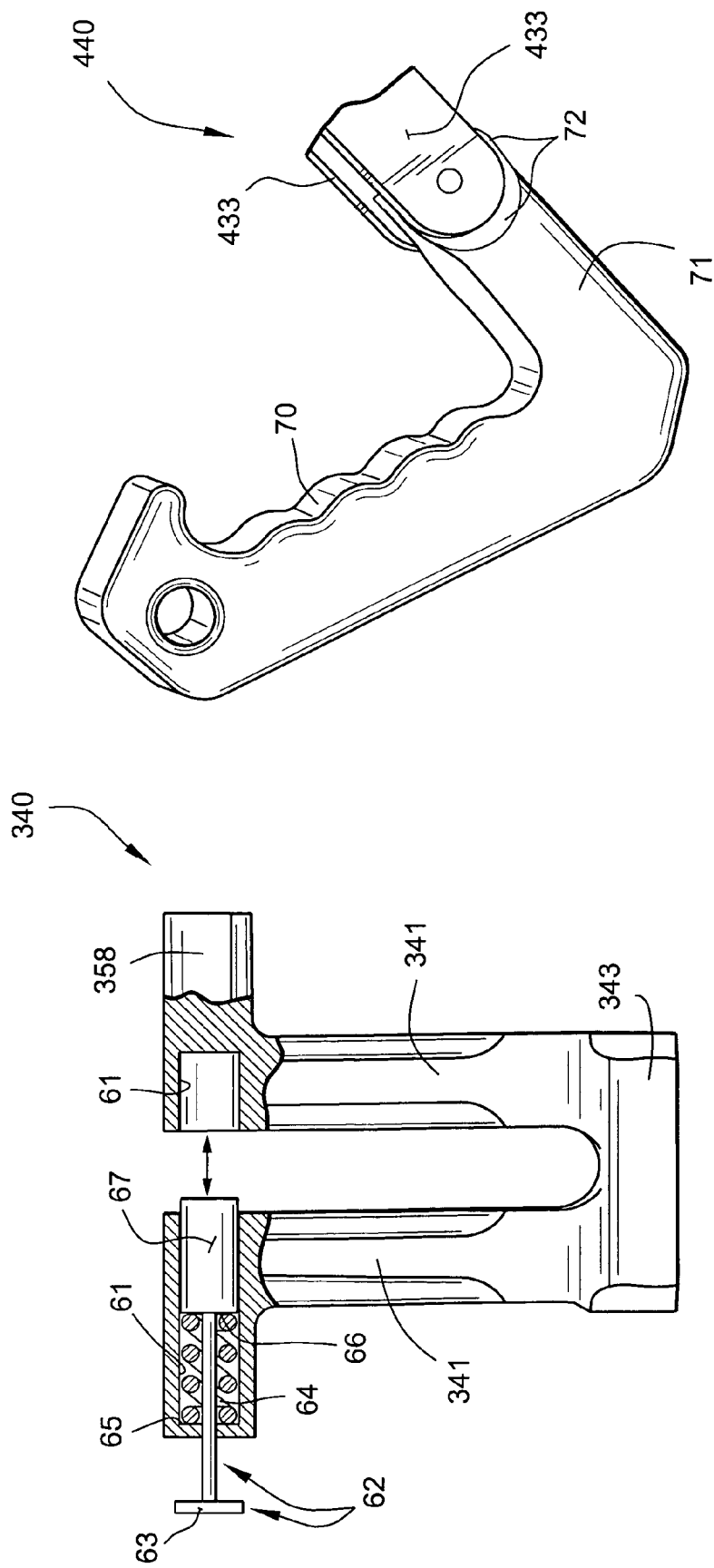

COMBINATION ASCENDER/DESCENDER

CROSS REFERENCE TO RELATED APPLICATION

This application claims the priority of U.S. Provisional Application 60/575,368 filed Jun. 1, 2004, the disclosure of which is hereby incorporated by reference herein.

SUMMARY OF THE INVENTION

In many jobs and activities it is highly desirable to provide a safe, secure, and easy to use way to both climb and descend a rope. This includes tree work, rock climbing, rescue work, and tower or building repair or maintenance. It has long been desirable to not only be able to both ascend and descend in a safe manner, but also to do so in a simple manner, using only one hand to tend the ascender/descender mechanism. It also has long been desired to provide a device of this type that is durable, automatically clamps when weight is applied, and easily attaches to, and detaches from, the rope. And it is desirable to be able to use a single ascender/descender employing either single rope technique or double rope technique.

According to the present invention, it is possible to both ascend and descend a rope in a simple, fast, and effective manner, even using only one hand for some maneuvers, and with either single or double rope technique, yet with complete safety. As used in this specification and claims, the term "rope" is not restricted to cotton, hemp, nylon, or other thread-like fibers intertwined into a conventional rope, but also includes cables, wires, lines, and other strands, as long as they are capable of being clamped by the mechanism utilized according to the invention. Also, as used in this specification and claims the term "torsional rigidity" with respect to the connecting element means that it is essentially incapable of being twisted under the normal conditions and forces that the element is subjected to during ascending or descending. Further, the term "operatively connected" or the like means, as it normally does, any suitable connection that allows the device to function substantially as desired, regardless of configuration or the exemplary embodiments illustrated herein.

According to one aspect of the present invention there is provided an ascending/descending assembly comprising: At least first, second, and third clamping elements, each element having a first side edge, a first end edge, and a main opening large enough for a rope extending in a first dimension therethrough, and a slot extending between the first side edge and the opening, allowing a rope to pass through the slot into the opening. A connecting element operatively pivotally connected adjacent (at or near) the first end edges of each of the first, second, and third clamping elements, and connecting the clamping elements together so that the first end edges thereof are substantially aligned, so that the second clamping element is between the first and third clamping elements, and so that the first side edges of some of the clamping elements (e.g. the first and the third) are aligned but so that the first side edge of at least one other clamping element (e.g. the second) is opposite thereto. The connecting element also operatively connects the clamping elements so that the openings therein can be aligned, and allow a rope to pass therethrough, in a first position of the clamping elements, and to clamp a rope to substantially prevent movement in a second position thereof.

The connecting element preferably has torsional rigidity, and in the preferred embodiment comprises a chain. Preferably there are also fourth and/or fifth clamping elements, with alternating positions of the first edges and slots thereof with the other clamping elements. The first clamping element preferably extends further from the chain than the others, to provide a first handle. Opposite the first clamping element from the second clamping element there preferably is a second handle pivotally connected to the connecting element (e.g. chain). The second handle has a longitudinal slot for receipt of a rope, and has an angled portion with a closed opening, through which a rope may pass and be knotted. An attachment element may also be provided on the opposite side of the first handle from the second handle. The attachment element provides for attachment of a carabineer or the like, for use with a shoulder harness for single rope technique; or the attachment block is attached to the biter end for double rope technique and for advancement the ascender/descender.

The clamping elements typically have second side edges opposite the first side edges thereof. The connecting element preferably comprises a plurality of chain links disposed exteriorly of each of the first and second side edges of the clamping elements, pivotally connected to the clamping elements. A torsion spring may be provided operatively connected to at lease one clamping element and at least one chain link to bias the clamping element. The clamping elements may be blocks or plates of metal (such as aluminum) or rigid plastic. The chain links may be of the same material if strong enough, but usually are steel or titanium. The ascender/descender may have a weight of less than one pound, yet still be capable of withstanding at least six thousand pounds of force.

According to another aspect of the present invention there is provided an ascending/descending assembly comprising: At least first, second, and third clamping elements, each element having a first end edge, and a main opening large enough for a rope extending in a first dimension therethrough. A connecting element pivotally connected to the first end edges of each of the first, second, and third clamping elements, and connecting the clamping elements together so that the first end edges thereof are substantially aligned. And, the connecting element having torsional rigidity but flexibility in one plane so as to allow separation of the clamping elements. The flexibility of the connecting element also facilitates automatic clamping action by the assembly.

The flexibility of the connecting element still further allows a rope passing through the openings to become radiused (with a reverse curvature from that assumed when allowing midline insertion of the rope) and so as to provide a simulated pulley for advancement of the elements along the rope. Handles, clamping elements comprising clamping blocks or plates having a configuration as described above, additional clamping blocks, and an attachment element, may be provided as described above. The connecting element may comprise exterior chain links pivotally connected to both side edges of the clamping blocks, or an interior (mounted in a cutout at the first end of the clamping blocks) roller chain or the like. A coil spring connected between a roller of the roller chain and a clamping element may provide bias.

According to another aspect of the invention there is provided an ascender/descender comprising: A plurality of clamping elements having tapered through extending openings therein. A device connecting the clamping elements together. A first handle operatively connected to the device adjacent a first end of the clamping elements and a second handle operatively connected to the device at a second end of the clamping elements, opposite the first end. And an attachment element operatively connected to the device adjacent the second handle, and having an opening therein capable of receiving a rope or a carabineer. A method of using this ascender/descender to ascend a rope, be automatically safely and securely held in position along the rope whenever weight is applied to the ascender/descender, and to freely or in a controlled manner descend the rope, comprises: attaching the attachment element to a carabineer or the like, for use with a shoulder harness, and practicing single rope technique; and, at some other point in time, attaching the attachment element to the biter end of a rope and practicing double rope technique, to facilitate advance of the ascender/descender.

It is the primary object of the present invention to provide a simple, strong, safe, and versatile ascender/descender and methods of use thereof. This and other objects of the invention will become clear from a detailed inspection of the invention, and from the appended claims.

BRIEF DESCRIPTION OF THE DRAWINGS

In the exemplary (only) embodiment of the invention illustrated in the drawings:

FIG. 1 is a side view of an ascending/descending assembly in a position allowing midline insertion of a rope into association with the assembly, the rope being shown primarily in dotted line;

FIG. 2 is a bottom plan view of a clamping element of the assembly of FIG. 1;

FIG. 3 is a side view, looking in on the open end of the channel, of the clamping element of FIG. 2, and FIG. 4 is a top plan view of the clamping element of FIG. 2;

FIG. 9 is a top view of the assembly of FIG. 1 with the attachment device pivoted out of the way and showing the assembly in a position wherein the clamping element openings are aligned to allow free movement of a rope (not shown) with respect to the assembly;

FIG. 10 is a schematic side view showing a reverse radius of the assembly to function as a simulated pulley as during self-tending or the like;

FIG. 11 is a view like that of FIG. 8 only showing a modified form of the assembly, and as used with double rope technique;

FIG. 12 is a perspective view of the bottom handle element of the modified assembly of FIG. 11;

FIG. 14 a partial left side view of the embodiment of FIG. 13;

FIG. 15 is an end view, partly in cross-section and partly in elevation, of a third form the handle of any of the embodiments of FIG. 1, 12, or 13 could take; and FIG. 16 is a perspective view of a fourth form of handle that may be utilized in a single rope technique ascender/descender according to the invention.

DETAILED DESCRIPTION OF THE DRAWINGS

Figures 5, 6:
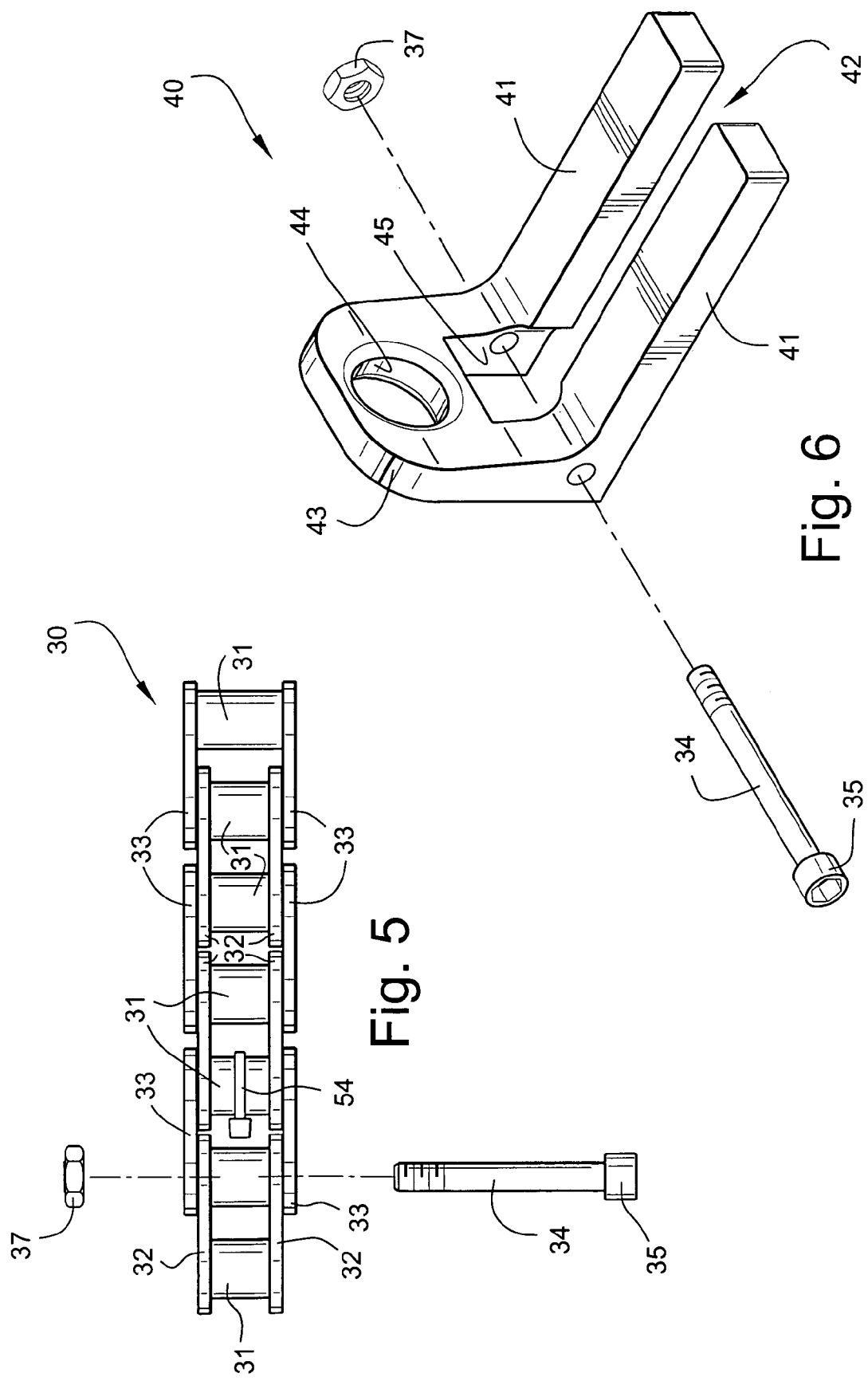
FIG. 5 is a top plan view of an exemplary connecting element (e.g. chain) of the assembly of FIG. 1.
FIG. 6 is a perspective exploded view of the bottom handle and connecting hardware of the assembly of FIG. 1.

An exemplary form of an ascending/descending assembly according to the present invention is illustrated generally at 10 in FIG. 1. The assembly 10 main components include at least first, second, and third clamping elements, 11, 12, and 13, respectively. In the embodiment actually illustrated, fourth and fifth clamping elements 14, 15 are also provided. Each element 11-15 has a first side edge 16 (especially see FIGS. 2-4), a first end edge 17, and a main opening 18 large enough for a rope [R in FIG. 1] extending in a first dimension therethrough. Each element 11-15 also has a slot 19 extending between the first side edge 16 and the opening 18, allowing a rope to pass sideways through the slot 19 into the opening 18. The elements 11-15 each typically have a second end edge 20, and a second, typically closed, side edge 21.

In the exemplary embodiment illustrated in the drawings, the clamping elements 11-15 comprise blocks or plates of metal (e.g. steel, aluminum, titanium, etc.) or hard plastic. The length of the blocks 11, 12, 14 and 15 (the distance between edges 17, 20) is preferably approximately 3-5 times the diameter of the rope R with which the assembly 10 is to be used. For example for a rope R ½ inch in diameter, the length of each of the blocks 11, 12, 14 and 15 may be two inches. The thickness of each block 11-15 [the dimension T in FIG. 3] is preferably roughly the same as the diameter of the rope R (e.g. about 0.35-0.65 inches for a rope R ½ inch in diameter). The width of each of the blocks 11-15 (the distance between the edges 16, 21 in FIGS. 2 & 4) is preferably about two—three times the diameter of the rope R (e.g. about 1.2 inches for a rope R ½ inch in diameter).

As seen in FIG. 1, preferably the top (in the normal orientation of the assembly 10 during ascent or descent) clamping block 13 has a length greater than that of the other blocks 11, 12, 14 & 15. This extra length is shown schematically by the dotted line extension in FIGS. 2-4, and generally by reference numeral 23. The portion 23 thus serves as a handle, as will be hereinafter described. The length of the portion 23 typically is about 40-75% the length of the blocks 11, 12, 14, 15 (e.g. about 1 inch for a rope R about ½ inch in diameter). Preferably all of the blocks 11, 12, 14 & 15 have substantially the same dimensions, and the block 13 has the same width and thickness as the other blocks, although all these dimensions may differ from block to block if desired.

As seen clearly in all of FIGS. 2-4, the slots 19, and openings 18, are preferably canted at an oblique angle (e.g. about 20-40°, preferably about 30°) from front to back (20 toward 17). This creates front 25 and rear 26 (see FIGS. 2 & 4) clamping ridges which preferably are relieved and rounded at the middle of the opening 18—as seen in FIGS. 2 & 4—at a smaller radius than the rope R (e.g. about 20-30% smaller). Also, the clamping ridges/surfaces 25, 26 are at an oblique angle (e.g. about 20-40°, preferably about 300) from back to front (17 toward 20).

Each block 11-15 in this embodiment also preferably includes a cutout 28 formed adjacent the end edge 17 thereof for receipt of a connecting element (hereinafter described).

The clamping ridges/surfaces 25, 26 have relief, and define smooth clamping (as opposed to cutting) surfaces. They are formed and designed in such a way that the clamping action will start slipping before the rope R could be severed. For example, for a conventional good quality ⅝ inch diameter nylon rope R, the assembly 10 will start to slip when a load of 1200-1500 pounds is applied, so as not to break the rope R which of course could result in the user falling, instead of slowly descending.

A connecting element 30 is operatively pivotally connected adjacent the first end edges 17 of each of the first, second, and third (and fourth and fifth where they are provided) clamping elements 11-13 (or 11-15). The connecting element 30 operatively connects the clamping elements 11-13 together so that the first end edges 17 thereof are substantially aligned, so that the second clamping element 12 is between the first and third clamping elements 11, 13, respectively, and so that the first side edges 16 of the first and third clamping elements 11, 13 are aligned but so that the first side edge 16 of the second clamping element is opposite thereto. In this way, the slots 19 alternate from top to bottom. The elements 14, 15, where provided, also are positioned so that the location of the slots 19 alternate along the dimension of the openings 18. The side-opening slots 19 allow the rope R to be inserted midline into operative association with the assembly 10, yet hold the rope R in place so that it will not inadvertently detach from the assembly 10.

The connecting element 30 also operatively connects the clamping elements 11-15 so that the openings 18 therein can be substantially aligned (see FIG. 9), and allows a rope to readily pass therethrough, in a first position of the connecting element 30. The connecting element 30 also operatively connects the clamping elements 11-15 so that the openings 18 are misaligned in such a way as to clamp a rope to substantially prevent movement of the rope in a second position thereof (see FIGS. 8 & 11). This last-mentioned operative connection is preferably such that the elements 11-15 automatically assume a clamping position when weight is applied to elements 11-15 (as through rope R').

The connecting element 30 preferably has torsional rigidity, and in the preferred embodiment comprises a chain, such as a steel roller or leaf chain, such as the roller chain 30 seen in FIG. 5. The pitch of the chain 30 preferably is roughly 20-30% (e.g. about 25%) longer than the thickness T of the blocks 11-15. The roller chain 30 has conventional rollers 31 with through extending passages (not shown) that are connected together by alternating inner 32 and outer 33 sets of chain links. Conventional roller chain rivets are removed from the roller chain and replaced by pins 34 (longer than the rivets they replace) that extend through the passages in the rollers 31, and aligned openings in the links 32, 33, to pivotally connect the chain 30 to the blocks 11-15. As seen in FIGS. 2-4 in particular, the pins 34 have a head 35 at one end (typically with an Allen-wrench opening 36 therein—see FIGS. 1 & 3), and are fastened with a nut 37 at the other end. Alternatively rivets (longer than the conventional rivets) can be used instead of the pins 34 with elements 35, 37. As seen in dotted line in FIG. 4, a roller 31, and supporting links 32, 33, is received within each cutout 28 adjacent the first end edge 17 of each block 11-15. In addition to mounting the blocks 11-15, the chain 30 transmits load between them.

While having torsional rigidity, according to the preferred embodiment of the invention the chain 30 is flexible in at least one plane, as seen clearly in FIG. 1, and as also seen in FIG. 10. This flexibility allows separation of the clamping blocks 11-15 (again, as seen in FIG. 1) so that the slots 19 of adjacent blocks 11-15 are spaced from each other enough to allow midline insertion or removal of the rope R from the assembly 10. This flexibility also allows the rope R axis to become radiused, and act as a simulated pulley for advancement of the assembly 10 with respect to the rope R, especially during self-tending, as seen schematically in FIG. 10. This flexibility also contributes to (or solely facilitates) the ability of the assembly 10 to automatically clamp on the rope R when weight is applied to the assembly 10, as through the rope R'.

Opposite the first clamping element 11 from the second clamping element 12 there preferably is a second (lower during normal orientation) handle 40 pivotally connected to the connecting element (e.g. chain) 30. The second handle 40 is seen most clearly in FIG. 6, and may be of the same material as the elements 11-15. Handle 40 has a pair of spaced arms 41 defining a longitudinal slot 42 for receipt of a rope R, and has an angled portion 43 (e.g. at substantially 90° with respect to the arms 41). The portion 43 has a closed (non-slotted) opening 44 therein, through which a rope R' (see FIG. 1), typically different from the rope R' may pass and be knotted (at K in FIG. 1). Within the cutout 45 in the angled portion 43, and adjacent the end of the slot 42 at the portion 43, a pin 34 is provided which passes through a roller 31, and links 32, 33, of the chain 30 disposed therein. Thus the handle 40 is operatively pivotally connected to the chain 30 in substantially the same way as are the blocks 11-15.

Figure 7:
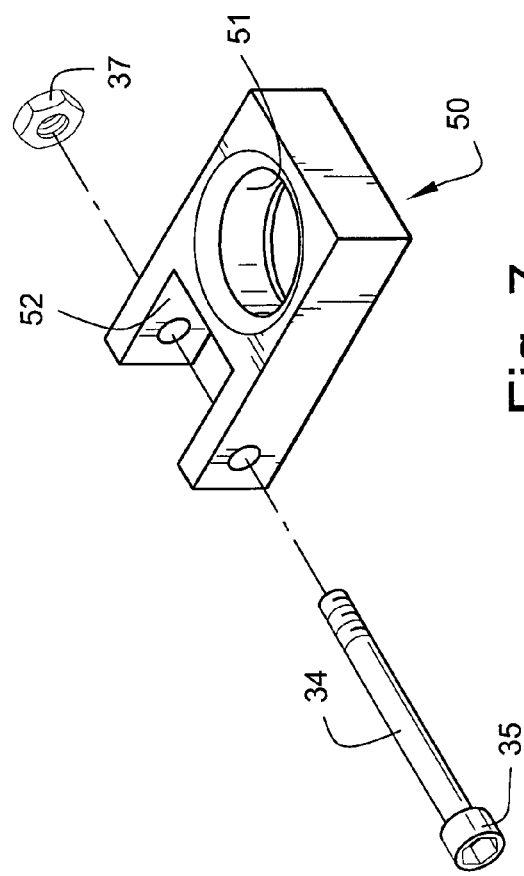
FIG. 7 is a perspective exploded view of the top attachment device and connecting hardware of the assembly of FIG. 1.

An attachment element 50 may also be provided on the opposite side of the first handle 23 from the second handle 40. The attachment element 50—seen most clearly in FIG. 7—may comprise a block or plate of the same material as the elements 11-15. Block 50 has a closed opening 51 therein which provides for attachment of a conventional carabineer (53 in FIGS. 1 & 8), or the like, for use with a shoulder harness for single rope technique or the like. Alternatively the attachment block 50, via opening 51, is attached to the biter end of rope R when employing double rope technique, or the like, to facilitate advancement of the ascender/descender 10. The attachment block 50 has a cutout 52 therein for receipt of a chain roller 31, links 32, 33, etc., and the passage of a pin 34, just like the elements 11-15 and 40, so that the block 50 is operatively pivotally attached to the chain 30.

Sometimes it is desirable to bias one or more of the blocks or plates 11-15, and/or 50, and/or the element 40, toward a particular position. For example it may be desirable to bias the blocks 11, 12 toward engagement of the surfaces 25, 26 thereof with a rope R. One way bias may be provided is shown in FIGS. 2 & 5. In this embodiment, a coil spring 55 is securely operatively connected at a first end 56 thereof to the block 11 (e.g. in cutout 28). The second end 57 thereof is operatively connected to the roller 31 associated with the block 12 of the chain 30. For example, a plastic band 54 (see FIG. 5) may be wrapped around the roller 31 associated with block 12, and the second end 57 of spring 55 securely affixed thereto. Other devices which bias may alternatively be provided, including other types of springs, elastomeric material blocks, etc.

FIG. 1 shows the assembly 10, which may be referred to as an ascender/descender, with the chain 30 flexing so as to provide separation between the elements 11-15, allowing midline insertion of the rope R. When the device 10 is in use with the rope R received by the openings 18, the elements 11-15 can be positioned with respect to each other to either allow substantially free passage of the rope, moderate squeezing of the rope R to allow controlled descent, or clamping of the rope R so that relative movement between the rope R and device 10 is substantially impossible. Preferably the elements 11-15 are self-loading, so that when in the clamped position the more force that is applied, the tighter the clamping action becomes.

Figure 8:
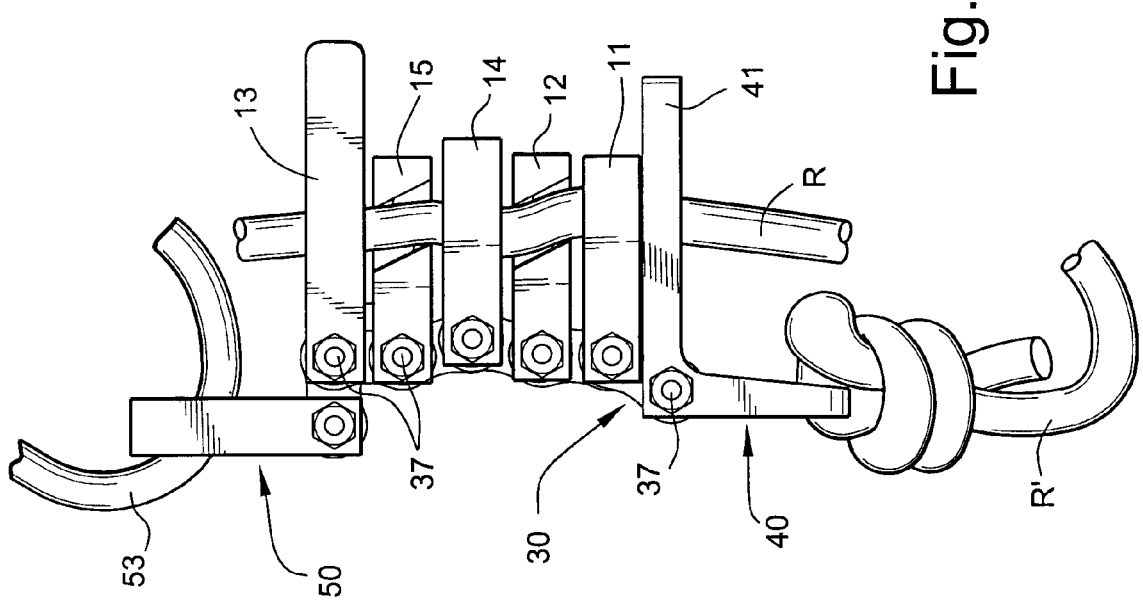
FIG. 8 is a side view of the assembly of FIG. 1 with the clamping elements in a position to automatically securely clamp a rope R when weight is applied as used with single rope technique.

FIG. 8 shows the clamping elements 11-15 in a position securely clamping the rope R, when using a single rope technique. In FIG. 8 the misalignment of the clamping elements 11-15 is exaggerated for clarity of illustration. The carabineer 53, if used, is clipped onto the users chest harness or the like, while the rope R is looped over a tree limb or the like, such as by using an anchor of the type shown in U.S. Pat. No. 6,715, 809 (incorporated by reference herein). The rope R' is operatively connected to the users saddle harness or the like by any desired mechanism (fixed or adjustable) and in any desired way.

FIG. 9 shows the assembly 10 with the attachment device 50 pivoted out of the way and in a position wherein the clamping element openings 18 are aligned to allow substantially free movement of the rope R with respect to the assembly 10.

FIG. 10 schematically illustrates the orientation of the chain 30 with respect to the elements 13, 40 (the elements 11, 12, 14, 15 and 50 not shown for clarity of illustration) during self-tending or the like, allowing self-tending with one hand as the openings 18 in the elements 11-15 are radiused to simulate a pulley.

FIG. 11 shows a modified form of an ascender/descender according to the present invention, shown generally by reference numeral 110, automatically clamped on the rope R when used with double rope technique. All of the components of the assembly 110 are the same as those of the assembly 10, and shown by the same reference numeral, except that only 4 clamping elements 11-14 are provided instead of five, and the bottom handle 140 is as illustrated in FIG. 12. In the FIG. 11 embodiment, the rope R is looped over a tree limb, rock out-cropping, or the like, and the biter end is knotted at K' after passage through the opening 51 in the attachment block 50. The other end (not shown) of the rope R is below the assembly 110. As with the single rope technique, the rope R' is operatively connected to the user's saddle harness or the like.

The second handle 140 is illustrated more clearly in FIG. 12 where components comparable to those in the FIG. 6 embodiment are shown by the same two digit reference numeral, only preceded by a "1". The main differences between the handle 140 and the handle 40 are the provision of the ears 58 on the arms 141 to facilitate grasping by the user, and the tapered and elongated form of the portion 143. The portion 143 also may have the edges rounded, and if desired a cushioning element 59 (e.g. of elastomeric material) may be provided over the majority of the portion 143 so that the user's hand is protected.

Figure 13:
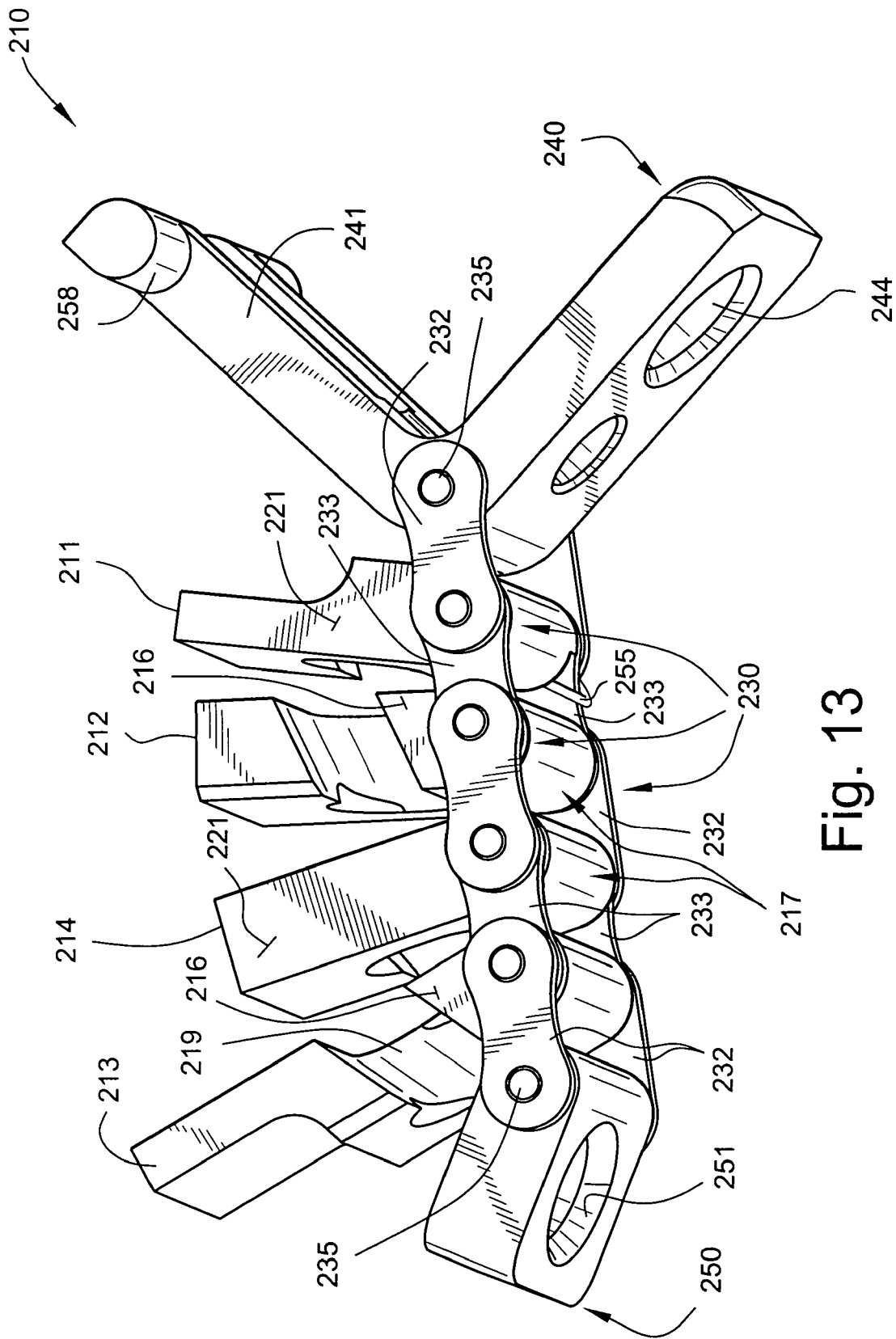
FIG. 13 is a right side perspective view of yet another embodiment according to the invention, one having chain links on the outside of the clamping elements.

The embodiment of FIGS. 13 and 14 is similar to the other embodiments except for the construction and position of the connecting element (preferably chain) with respect to the other components, and the configuration of the biasing device. In this embodiment components comparable to those in the FIGS. 1-11 embodiments have the same two digit reference numeral, preceded by a "2".

The most significant distinction of the FIGS. 13 and 14 assembly 210 is the position of the connecting element (preferably chain) 230. Instead of being relatively interiorly mounted as in FIGS. 1-11, the chain 230 of FIGS. 13 and 14 is exteriorly mounted with respect to the clamping elements 211-214. This has numerous advantages, including allowing the assembly 210 to be lighter smaller for a given strength, and to allow a stronger assembly to be more readily constructed. As seen for the side arbitrarily referred to as the "right side" in FIG. 13, and for the "left side" in FIG. 14, the chain links 232, 233 are exterior of the clamping elements 211-214 and are pinned thereto using pins 234 having heads 235 at the "right side" (FIG. 13), and having end terminations with heads or grooves that receive the conventional E-springs 60 at the "left side" (FIG. 14) thereof holding the links 232, 233 in proper position to perform their functions.

Another distinction of the FIGS. 13 & 14 embodiment is that bias is applied to one or more clamping elements by a torsion spring 255, instead of the coil spring 55 described above. The spring 255 biases the element 212 so that it moves toward the ears 258 of the handle 240 with respect to the element 211.

The assembly 210 can be light weight. All components illustrated in FIGS. 13 & 14 can be made of aluminum or a like light weight material, except that typically the E-springs 60 and the torsion spring 255 are of spring steel (and possibly the pins 234 are of steel), and, the links 232, 233 are of steel, titanium, or a like strong material that can readily hold a force of over 6,000 pounds. One version of 210 can hold 10,000 pounds, yet is only about 1.5 pounds in weight, having elements 211-214 that are about ⅝ inch thick and about 1.5 inches wide. Another version can hold about 7,000 pounds yet is under a pound in weight itself (e.g. about 14 oz.), having elements 211-215 about 1 inch wide and about ½ inch thick.

FIG. 15 illustrates another exemplary embodiment of a handle 340 (components the same as those in the other embodiments having the same two digit reference numeral only preceded by a "3") that can have a "locking" mechanism to keep a rope between the arms 341. This is done by providing the ears 358 as at least partial tubes, having interior passages 61, with a releasable spring-pressed pin 62 extending between the tubes 358. In the position illustrated in FIG. 15, the head 63 of the pin 62 has been manually grasped by the user and moved to the left (as seen in FIG. 15), compressing the coil spring 64 positioned between stationary and moveable, respectively, stops 65, 66. This moves the locking section 67 of pin 62 out of the passage 61 of the ear 358 on the right of FIG. 15, allowing a rope to pass between the arms 341. When the head 63 is released, the spring 64 moves the portion 67 into the passage 61 of the right ear 358 in FIG. 15, substantially precluding a rope from exiting between the arms 341.

FIG. 16 illustrates another exemplary embodiment of a handle 440 (components the same as those in the other embodiments have the same two digit reference numeral only preceded by a "4"), useable primarily for single rope technique. The handle 440 has finger grip portions 70 thereof, and makes substantially a right angle with respect to portion 71 which is connected to chain links 433. There is a recess 72 provided for each chain link 433 in portion 71, so that the links 433 actually attached to portion 71 will remain substantially rigid when the user moves the handle 440 with an upward force when employing single rope technique.

During an exemplary use of the assembly 110 (the use of the assemblies 10 and 210 are substantially identical), when the user desires to ascend the rope R, he/she puts one hand around the handle portion 143 and pushes upwardly, while the other hand grasps the rope R above the assembly 110 and pulls upwardly. Pushing upwardly on the assembly 110 using the handle portion 143 substantially aligns the openings 18 in the clamping elements 11-14 (substantially as seen in FIG. 9) to allow ready movement of the assembly 110 up the rope R. When the handle portion 143 is released, the user's weight is applied to the rope R', which causes the elements 11-14 to automatically assume the clamping position of FIG. 11, and the user is securely and safely-held in that position. This action is repeated until the user ascends to the desired height.

When the user wishes to descend, he/she simply grasps (with one hand) onto the first handle portion 23 of the element 13, and the ears 58 of the second handle 140, and forces them toward each other. Depending upon how much such force is applied, this partially or fully releases the clamping action of the elements 11-14, allowing substantially free, or precisely controlled, movement of the rope R through the openings 18. Whenever the user releases the force moving the handle portions 23, 58 toward each other, the assembly 110 automatically returns to the secure clamping position of FIG. 11, and descent is stopped.

While the invention has been herein shown and described in what is presently conceived to be the most practical and preferred embodiment thereof it is to be understood that the invention is to be accorded the broadest interpretation possible consistent with the prior art, and in its various aspects some features are broader than in other aspects. Also, all ranges disclosed are approximate and all narrow ranges within a broad range are also specifically disclosed herein. For example a pitch of the chain 30 roughly 20-30% longer than the thickness T of the blocks 11-15 means about 21-25%, about 24-26%, about 26-30%, and all other narrower ranges within the broad range.

What is claimed is:

1. An ascending/descending assembly comprising: at least first, second, and third clamping elements, each element having a first side edge, a first end edge, a main opening large enough for a rope extending in a first dimension therethrough and having front and rear clamping surfaces, and a slot extending between the first side edge and the opening, the slot allowing a rope to pass through the slot into the opening; a connecting element operatively pivotally connected adjacent the first end edges of each of the first, second, and third clamping elements, and connecting the clamping elements together so that the first end edges thereof are substantially aligned, so that the second clamping element is between the first and third clamping elements, and so that the first side edges of some of the clamping elements are aligned but so that the first side edge of at least one other clamping element is opposite thereto; and the connecting element also operatively connecting the clamping elements so that the openings therein can be substantially aligned, and allow a rope to pass therethrough, in a first position of the clamping elements, and to clamp a rope using at least some of the clamping surfaces to substantially prevent movement thereof in a second position thereof; and wherein the third clamping element extends further from the connecting element than the other clamping elements, to provide a first handle.

2. An assembly as recited in claim 1 wherein the connecting element has torsional rigidity, but is flexible in at least one plane to allow the clamping elements to separate so that a rope may be inserted midline through the slots into the openings therein.

3. An assembly as recited in claim 2 wherein the connecting element comprises a chain.

4. An assembly as recited in claim 1 further comprising fourth and fifth clamping elements, with alternating positions of the first edges and slots thereof with the third clamping element.

5. An assembly as recited in claim 1 further comprising, opposite the third clamping element from the second clamping element, a second handle operatively pivotally connected to the connecting element.

6. An assembly as recited in claim 5 wherein the second handle has a longitudinal slot for receipt of a rope, and has an angled portion with a closed opening, through which a rope may pass and be knotted.

7. An assembly as recited in claim 5 further comprising an attachment element on the opposite side of the first handle from the second handle, the attachment element providing for attachment of a carabineer or the like, for use with a shoulder harness for single rope technique; or for attachment to the biter end for double rope technique to facilitate advance of the ascender/descender assembly.

8. An assembly as recited in claim 1 wherein the clamping elements have second side edges opposite the first side edges thereof; and wherein the connecting element comprises a plurality of chain links disposed exteriorly of each of said first and second side edges of said clamping elements, pivotally connected to the clamping elements.

9. An assembly as recited in claim 1 in combination with a rope, and wherein the thickness of each clamping element is roughly the same as the diameter of the rope; wherein the length of each clamping element is about three-five times the diameter of the rope; and wherein the width of each clamping element is about two-three times the diameter of the rope.

10. An ascending/descending assembly comprising: at least first, second, and third clamping elements, each element having a first end edge, and a main opening large enough for a rope extending in a first dimension therethrough; a connecting element operatively pivotally connected adjacent the first end edges of each of the first, second, and third clamping elements, and connecting the clamping elements together so that the first end edges thereof are substantially aligned; and wherein the connecting element has torsional rigidity but is flexible in at least one plane.

11. An assembly as recited in claim 10 wherein the flexibility of the connecting element also allows a rope passing through the openings to become radiused and so as to provide a simulated pulley, or to become radiused to allow separation of the clamping elements from each other.

12. An assembly as recited in claims 10 wherein the connecting element comprises a chain.

13. An assembly as recited in claim 12 wherein the pitch of the chain is roughly 20-30% longer than the thickness of a clamping element.

14. An assembly as recited in claim 12 wherein the clamping elements have first and second side edges; and wherein the chain comprises a plurality of chain links pivotally connected to the clamping elements exteriorly of the first and second side edges thereof.

15. An assembly as recited in claim 12 further comprising a biasing device operatively connected to at least one clamping element and to at least one portion of the chain.

16. An assembly as recited in claim 10 wherein the thickness of each clamping element is roughly the same as the diameter of a rope to be utilized therewith; wherein the length of each clamping element is about three-five times the diameter of a rope to be utilized therewith; and wherein the width of each clamping element is about two-three times the diameter of a rope to be utilized therewith.

17. An assembly as recited in claim 12 wherein the third clamping element preferably extends further from the connecting element than the others, to provide a first handle; and further comprising, opposite the third clamping element from the second clamping element, a second handle operatively pivotally connected to the connecting element; and further comprising an attachment element on the opposite side of the first handle from the second handle, the attachment element providing for attachment of a carabineer or the like, for use with a shoulder harness for single rope technique; and for attachment to the biter end for double rope technique to facilitate advance the ascender/descender assembly.

18. An ascending/descending assembly comprising: at least first, second, and third clamping elements, each element having a first side edge, a first end edge, a main opening large enough for a rope extending in a first dimension therethrough and having front and rear clamping surfaces, and a slot extending between the first side edge and the opening, the slot allowing a rope to pass through the slot into the opening; a connecting element operatively pivotally connected adjacent the first end edges of each of the first, second, and third clamping elements, and connecting the clamping elements together so that the first end edges thereof are substantially aligned, so that the second clamping element is between the first and third clamping elements, and so that the first side edges of some of the clamping elements are aligned but so that the first side edge of at least one other clamping element is opposite thereto; and the connecting element also operatively connecting the clamping elements so that the openings therein can be substantially aligned, and allow a rope to pass therethrough, in a first position of the clamping elements, and to clamp a rope using at least some of the clamping surfaces to substantially prevent movement thereof in a second position thereof; and wherein the clamping elements have second side edges opposite the first side edges thereof; and wherein the connecting element comprises a plurality of chain links disposed exteriorly of each of said first and second side edges of said clamping elements, pivotally connected to the clamping elements.

* * * * *